US009969362B2

(12) United States Patent
 Picot

(10) Patent No.: US 9,969,362 B2
(45) Date of Patent: May 15, 2018

(54) DEVICE FOR RETAINING A PIPE, NOTABLY FOR WINDSCREEN WASHER LIQUID

(71) Applicant: Valeo Systèmes d'Essuyage, Le Mesnil Saint Denis (FR)

(72) Inventor: Philippe Picot, Les Pradeaux (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 723 days.

(21) Appl. No.: 13/940,638

(22) Filed: Jul. 12, 2013

(65) Prior Publication Data

US 2014/0013533 A1    Jan. 16, 2014

(30) Foreign Application Priority Data

Jul. 12, 2012  (FR) ...................................... 12 56734

(51) Int. Cl.
 *B60S 1/48* (2006.01)
 *B60S 1/34* (2006.01)
 *B60S 1/52* (2006.01)

(52) U.S. Cl.
 CPC .............. *B60S 1/48* (2013.01); *B60S 1/3415* (2013.01); *B60S 1/524* (2013.01); *B60S 1/3481* (2013.01); *Y10T 29/49826* (2015.01)

(58) Field of Classification Search
 CPC ...... B60S 1/3415; B60S 1/3425; B60S 1/524; B60S 1/522; B60S 1/3862
 (Continued)

(56) References Cited

U.S. PATENT DOCUMENTS 2,632,911 A * 3/1953 Deibel .................... B60S 1/522
                                                   15/250.04
3,422,484 A * 1/1969 Carpenter ............... B60S 1/522
                                                   15/250.04
(Continued)

FOREIGN PATENT DOCUMENTS

FR        2746750 A1    10/1997
JP        H0386874 U     9/1991
(Continued)

OTHER PUBLICATIONS

JP2006306286A (machine translation), 2006.*
(Continued)

*Primary Examiner* — Andrew A Horton
(74) *Attorney, Agent, or Firm* — Osha Liang LLP

(57) ABSTRACT

The subject of the device is a retaining device (1) for retaining a windscreen washer liquid pipe (2), the device comprising:
 the pipe (2),
 a driver (10) comprising an orifice (11) arranged to receive a rotation shaft, this shaft being rotated about a rotation axis (X), the driver (10) having an outer contour (13) when this driver (10) is observed along the rotation axis (X),
 optionally a cap, notably fitted to the driver,
characterized in that at least one of the driver (10) and of the optional cap comprises a housing (30) arranged to receive at least partly the pipe (2) in the following configuration:
 the pipe (2) comprises a curved portion (12) around the orifice (11),
 when the device is observed along the rotation axis (X) with the cap assembled on the driver (10), the curved portion (12) of the pipe (2) is set back from the outer contour (13) of the driver (10).

9 Claims, 4 Drawing Sheets

Figure 1:
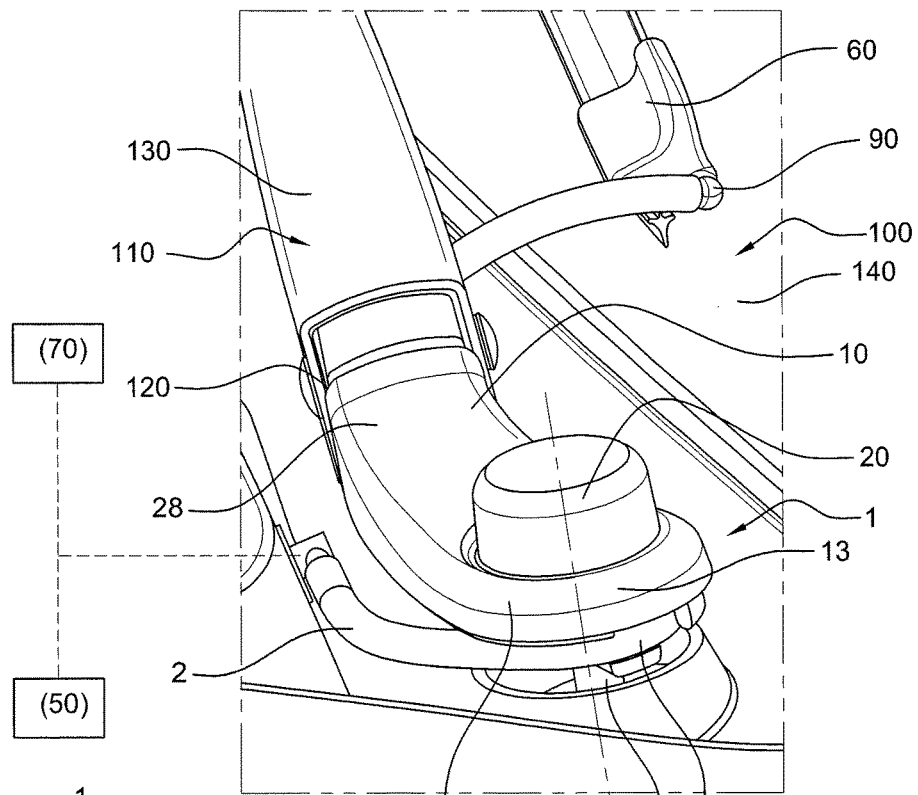

(58) Field of Classification Search
    USPC ..................................................... 15/250.04
    See application file for complete search history.

(56) References Cited

U.S. PATENT DOCUMENTS

| | | | | |
|---|---|---|---|---|
| 3,574,883 | A * | 4/1971 | Brittain | B60S 1/3415 |
| | | | | 15/250.02 |
| 5,283,926 | A * | 2/1994 | Hoshino | B60S 1/3415 |
| | | | | 15/250.34 |
| 5,986,371 | A * | 11/1999 | Savy | B60S 1/3415 |
| | | | | 15/250.01 |
| 6,094,772 | A * | 8/2000 | West | B60S 1/3415 |
| | | | | 15/250.04 |
| 6,286,174 | B1 * | 9/2001 | Zimmer | B60S 1/522 |
| | | | | 15/250.04 |
| 2002/0133893 | A1 * | 9/2002 | Hasegawa | B60S 1/3415 |
| | | | | 15/250.04 |
| 2006/0265832 | A1 * | 11/2006 | Powell, Jr. | B60S 1/0436 |
| | | | | 15/250.31 |
| 2014/0173846 | A1 * | 6/2014 | Peschard | B60S 1/3425 |
| | | | | 15/250.34 |

FOREIGN PATENT DOCUMENTS

| | | | |
|---|---|---|---|
| JP | 2002059813 A | | 2/2002 |
| JP | 2003327090 A | * | 11/2003 |
| JP | 2006-306286 A | | 11/2006 |

OTHER PUBLICATIONS

Office Action issued in corresponding Chinese Application No. 201310407711.6 dated Dec. 9, 2015, and English translation thereof (18 pages).

Office Action Issued in Corresponding Mexican Application No. MX/a/2013/008117, dated Jun. 14, 2016 (8 pages with English Translation).

* cited by examiner

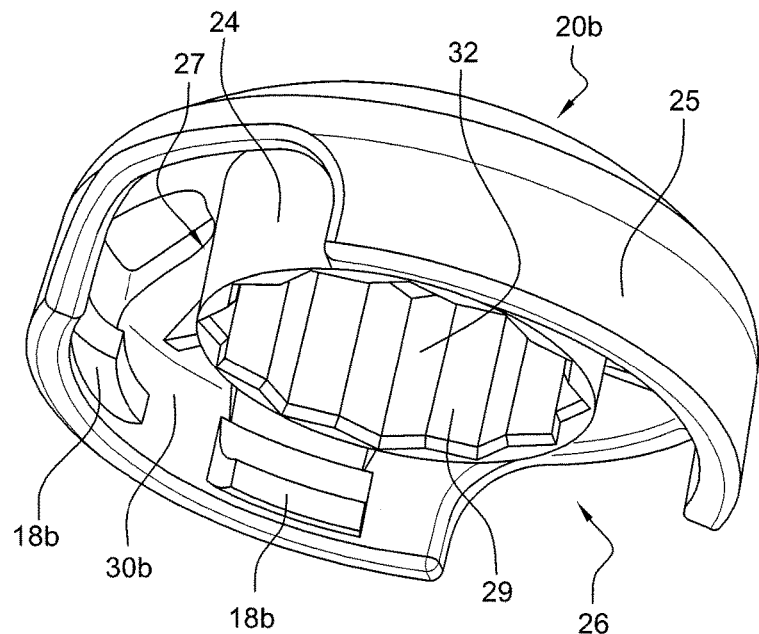
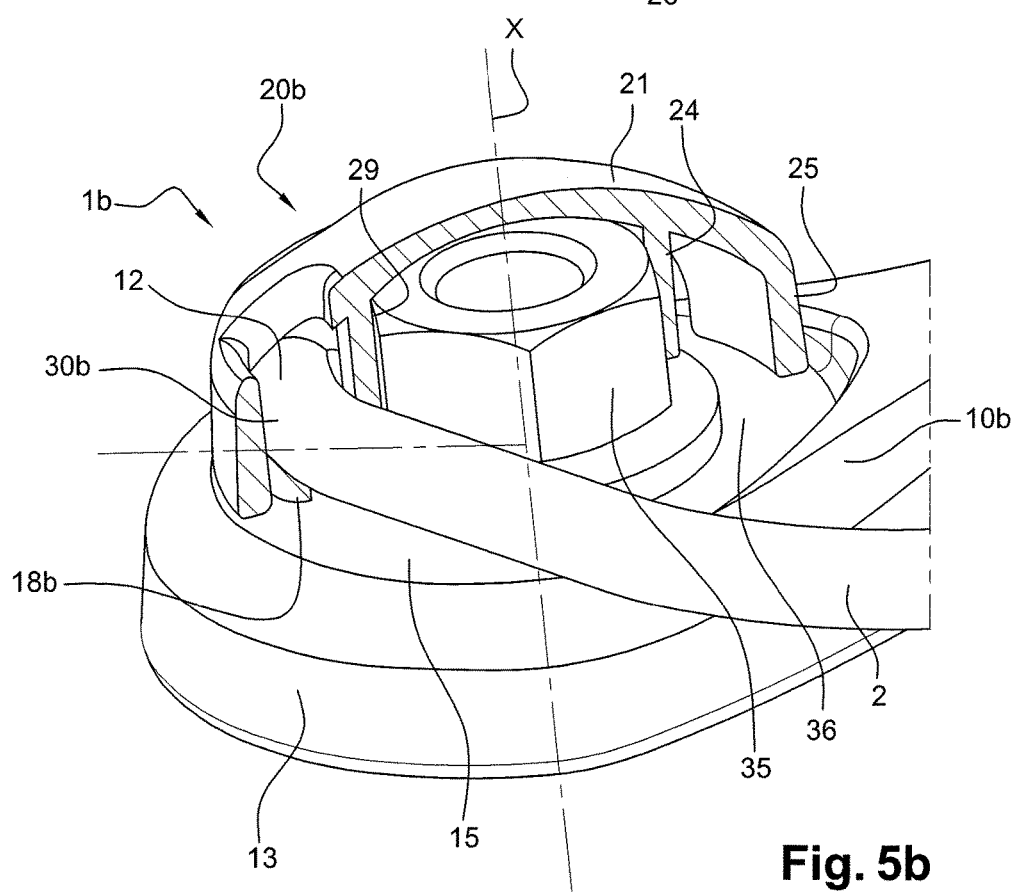
Fig. 5a
Fig. 5b

DEVICE FOR RETAINING A PIPE, NOTABLY FOR WINDSCREEN WASHER LIQUID

The invention relates to a retaining device for retaining a pipe, notably for windscreen washer liquid, on a wiping system of a motor vehicle.

Wiping systems for motor vehicles incorporate wiper blades for clearing away any form of water or solid residues, for example insects, that may inconvenience the vehicle driver when driving. In order to improve the clearance of the solid residues and to effectively clean the windscreen, it is possible to spray onto the windscreen a solution, often a hydroalcoholic solution, of the motor vehicle windscreen washer liquid type. The windscreen washer liquid is sprayed onto the windscreen by virtue of spraying devices. These spraying devices may preferably be provided on the bonnet by virtue of nozzles incorporated into this bonnet or else be incorporated directly into the structure of the wiper blade in order to improve the washing of the windscreen, by means of a multitude of microperforations along the wiper arm. In the latter case, it is necessary to convey the windscreen washer liquid directly to the wiper blade by virtue of a pipe, which must be retained correctly during the to-and-fro movements of the blade on the windscreen.

Patent application JP2006-306286 describes a windscreen wiper comprising an arm head connected to a drive shaft, this head being covered by a cover. A windscreen washer liquid pipe, which extends both along the arm and along the arm head, is connected to a washing nozzle attached to the blade to spray a windscreen washer liquid onto the windscreen. The pipe is first positioned on the arm head against an annular wall of this arm head and is then held in position by the cover once the latter is folded down onto the arm head.

This implementation has a drawback. Specifically, to retain the windscreen washer liquid pipe on the arm head, it is necessary to trap a portion of the pipe which is then in contact with two parts, namely the arm head and the cover. Having two parts to retain the windscreen washer liquid pipe may generate complex mounting operations, notably requiring a precise clearance between the two parts.

Moreover, when the pipe is mounted on the arm head, it is necessary to temporarily retain the pipe in position on the head while the cover is lowered. This handling step is tricky because it requires attention on the part of the operator to ensure a good retention of the windscreen washer liquid pipe on the arm head.

An object of the invention is notably to propose a device for retaining a pipe, notably for windscreen washer liquid, on a wiping system in a relatively simple manner.

This object is achieved, according to the present invention, by virtue of a retaining device for retaining a pipe, notably for windscreen washer liquid, the device comprising:
the pipe,
a driver comprising an orifice arranged to receive a rotation, this shaft being rotated about a rotation axis, the driver having an outer contour when this driver is observed along the rotation axis,
optionally a cap, notably fitted to the driver,
said device being characterized in that at least one of the driver and of the optional cap comprises a housing arranged to receive at least partly the pipe in the following configuration:

the pipe comprises a curved portion around the orifice, when the device is observed along the rotation axis with the cap assembled on the driver, the curved portion of the pipe is set back from the outer contour of the driver.

Whether the housing receiving the curved portion of the pipe is on the driver or the cap, the invention makes it possible, in both cases, to retain this curved portion of the pipe by virtue of a single part, mainly either the driver or the cap. This makes it possible to avoid using an additional part for retaining the curved portion.

In other words, the curved portion of the pipe is retained self-sufficiently by the driver or the cap.

Moreover, since the curved portion of the pipe is set back from the outer contour of the driver, this curved portion is at least partly hidden, which improves the appearance of the wiping system.

In a particularly advantageous manner, the retaining device is arranged to allow a removable mounting of the pipe in the housing.

The windscreen washer liquid pipe is arranged so as to be able to be connected at a first end to a windscreen washer liquid reservoir and at a second end to a windscreen washer liquid spraying device, notably associated with a windscreen wiper blade. The pipe is flexible, advantageously being made of EPDM (ethylene-propylene-diene monomer).

If desired, the driver has a shape that is substantially elongate along a longitudinal axis and the orifice is situated close to a longitudinal end of the driver. This orifice has for example a substantially circular shape when it is observed along the rotation axis.

The outer contour of the driver preferably has a substantially circularly arcuate shape around the orifice.

In one exemplary embodiment of the invention, the housing receiving the curved portion of the pipe is formed on the driver. Preferably, this driver comprises a lower face, notably substantially flat, and the housing is formed on this lower face. The housing of the driver is for example formed between at least one radially inner rib and one radially outer rib.

Advantageously, at least one of the inner rib and the outer rib is of circularly arcuate shape, notably centred on the orifice of the driver, when the driver is observed along the rotation axis Advantageously, at least one of the inner and outer ribs extends over an angular aperture of at least 10°, notably 45°, for example at least 180°.

If desired, the driver comprises at least two outer ribs.

Advantageously, the driver comprises at least one click-and-ratchet fastener arranged to retain the curved portion of the pipe in the housing. This click-and-ratchet fastener is made with one of the inner and outer ribs, preferably with the inner rib. Advantageously, the click-and-ratchet fastener is made in one piece with the driver.

The click-and-ratchet fastener comprises for example a return which extends parallel to the lower face of the driver, and which comes into contact with the curved portion of the pipe.

The driver preferably comprises at least one element for guiding the windscreen washer liquid pipe, notably arranged to guide the curved portion of the pipe towards the housing. This guidance element comprises for example a pin and this guidance element is preferably made in one piece with the driver.

If necessary, the driver is made of aluminium and preferably obtained by moulding.

For its part, the cap is preferably placed on the upper face, notably substantially flat, of the driver and this cap may be at a distance from the curved portion of the pipe.

Advantageously, the cap has a substantially circular contour.

In another exemplary embodiment of the invention, the housing receiving the curved portion of the pipe is formed on the cap. This cap comprises an upper face, notably substantially convex, and the housing of the cap is advantageously formed between a radially inner skirt and a radially outer skirt of the cap. Preferably, at least one of the inner skirt and the outer skirt has a substantially axisymmetric cylindrical shape with its axis parallel to the rotation axis.

The cap preferably comprises at least one click-and-ratchet fastener arranged to retain the curved portion of the pipe in the housing of the cap. This click-and-ratchet fastener is connected to one of the inner and outer skirts of the cap, preferably to the outer skirt. Advantageously, the click-and-ratchet fastener is made in a single piece with the cap. The click-and-ratchet fastener comprises a return which extends parallel to the lower face of the driver, and which comes into contact with the curved portion of the pipe.

The cap preferably comprises an entrance slot opening into the housing and an exit slot from the housing and the curved portion of the pipe extends from the entrance slot to the exit slot. The entrance and exit slots are advantageously formed on the outer skirt of the cap.

The housing may be arranged such that the curved portion of the pipe extends over an angular aperture of at least 10°, notably 45°, for example at least 180°. The distance between the entrance and exit slots allows for example the curved portion of the pipe to extend over an angular aperture of at least 10°, notably 45°, for example at least 180°.

Preferably, the cap is made of plastic and is advantageously obtained by injection moulding.

A further subject of the invention is a wiping system for a motor vehicle, the wiping system comprising:
 a device for retaining a windscreen washer liquid pipe as above,
 a driving motor and/or a linkage arranged to drive a rotation shaft, the rotation shaft being capable of interacting with the driver of the retaining device.

The rotation shaft is therefore connected on the one hand to the driver and on the other hand to the driving motor and/or to the linkage.

If desired, the orifice of the driver is capable of interacting with the upper end of the rotation shaft and the cap is capable of covering the upper end of the rotation shaft. This cap is preferably removably attached to the rotation shaft.

The wiping system may comprise:
 an arm arranged to interact with the driver,
 a wiper blade arranged to interact with the arm,
 a windscreen washer liquid spraying device associated with the arm.

The wiping system also preferably comprises a reservoir and a windscreen washer liquid pump connected to one end of the pipe of the retaining device, the pump being used to carry the windscreen washer liquid from the reservoir to the spraying device. The pump is arranged so as to be initiated by the user from the inside of the vehicle.

The invention also relates to a method for inserting a pipe into a retaining device as aforementioned, the method comprising the step of mounting the pipe on the retaining device.

The method may comprise the following step:
 inserting substantially radially the windscreen washer liquid pipe into the housing of the driver or else
 inserting substantially axially the windscreen washer liquid pipe into the housing of the cap.

Figure 2A:
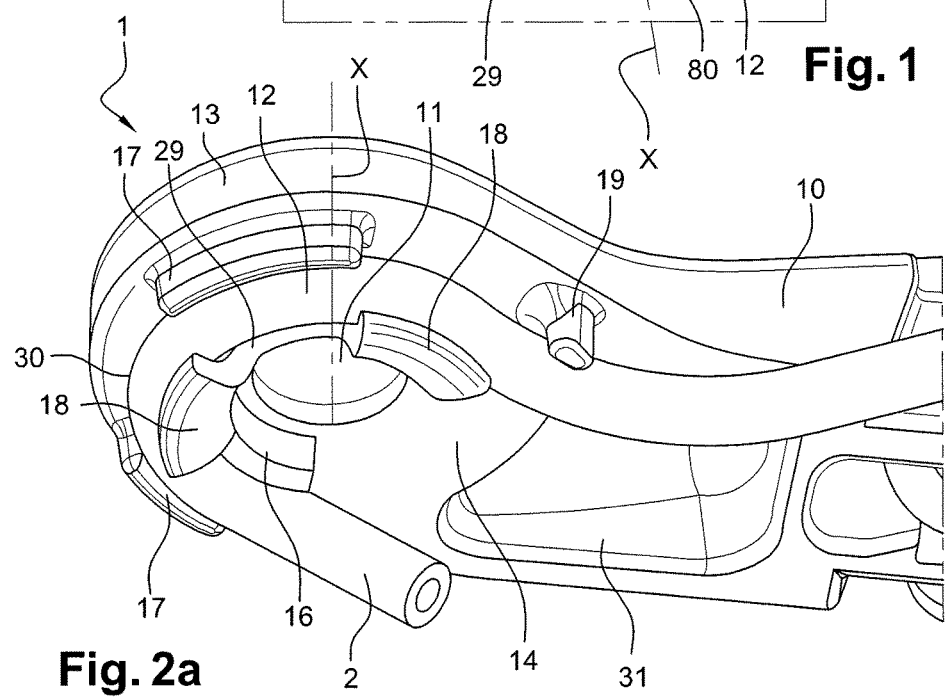
Figure 2B:
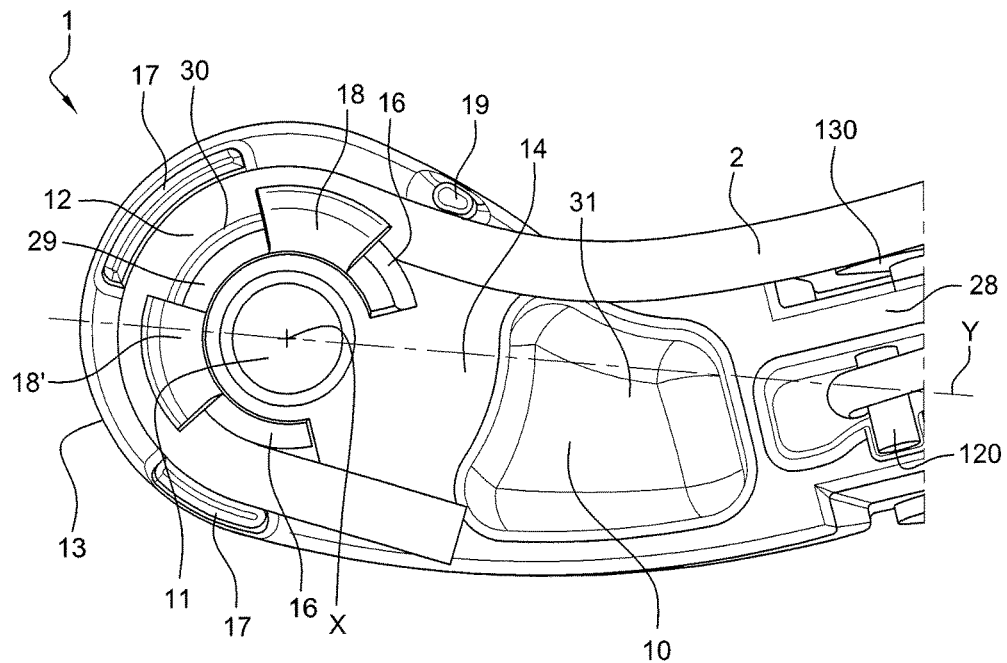
Figure 3:
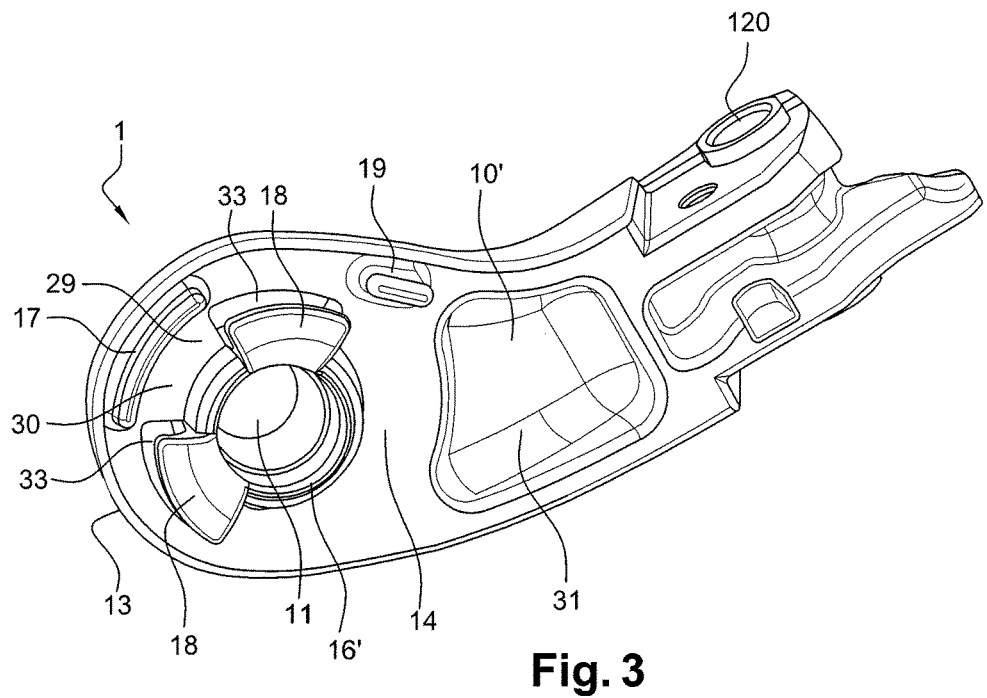
Figure 4A:
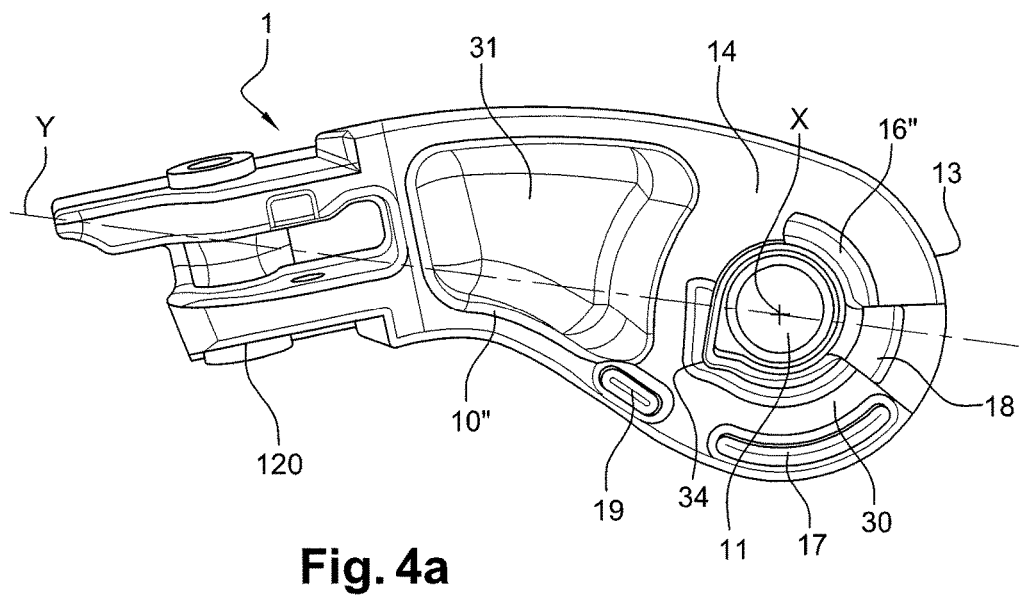
Figure 4B:
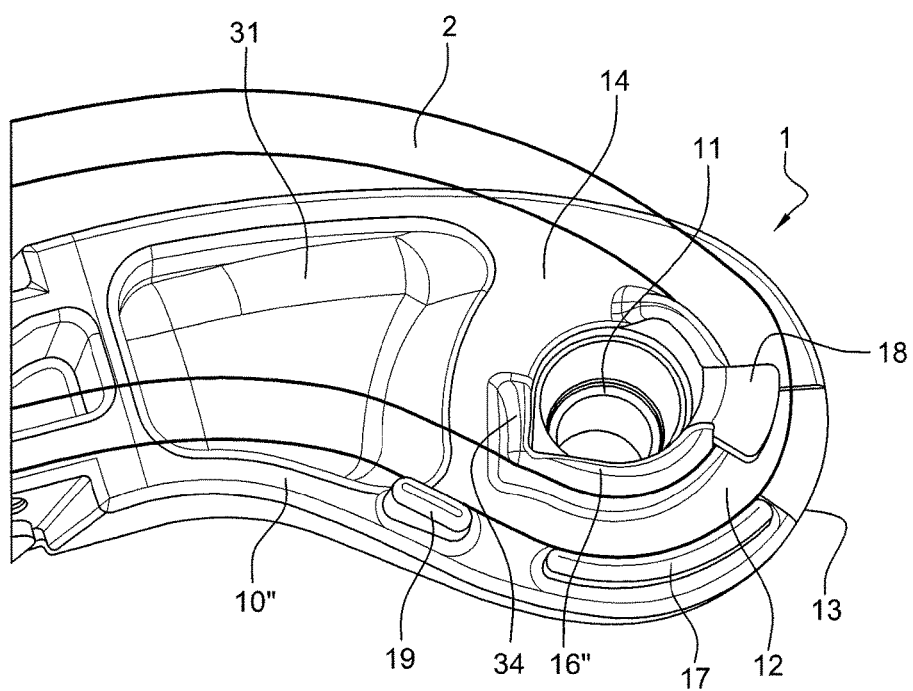

Other features and advantages of the invention will become apparent on reading the following detailed description, for the understanding of which reference should be made to the appended drawings, in which:

FIG. 1 is a schematic and partial view of a wiping system according to a first embodiment of the invention, FIGS. 2a and 2b are two schematic and partial views of the retaining device of the wiping system according to the embodiment of FIG. 1, respectively in perspective and along the rotation axis of the driver, FIG. 3 is a schematic and partial view of a driver according to another exemplary embodiment of the invention, FIGS. 4a and 4b are two schematic and partial views of a retaining device according to another embodiment, respectively without and with the pipe, FIG. 5a is a schematic and partial view of the cap according to another embodiment of the invention, and FIG. 5b is a schematic and partial view of a retaining device with the cap of FIG. 5a.

FIG. 1 illustrates a driver 10 forming part of a blade holder 110 installed on a vehicle. The blade holder 110 comprises, in addition to the driver 10, an arm 130 secured to the driver 10 by means of a pivot assembly 120 known per se. The pivot assembly 120 allows the user to be able to pivot the arm 130 relative to the driver 10 and thus allow the handling of a wiper blade 60 placed at one end of the arm 130.

The wiper blade 60 clears away the water that is present on the windscreen 140 of the vehicle. Such a wiper blade 60 is for example of the flat blade type, that is to say comprising a squeegee, one or more stiffening vertebrae and a single central fastening made by a mechanical connector linked to the end of the arm 130. Such a flat blade may also comprise an air deflector secured to the blade and arranged to make use of the dynamic effect of the movement of the vehicle to increase the pressure of the wiper blade 60 on the windscreen 140.

The blade holder 130 or the wiper blade 60 are associated with a device 90 for spraying a liquid for washing the windscreen 140. According to the exemplary embodiment shown in FIG. 1, the spraying device 90 may comprise a duct incorporated into the wiper blade 60, which duct runs along the longitudinal axis of this wiper blade 60. Such a duct may for example be formed in a portion of the structure of the air deflector. According to an exemplary embodiment not shown, the spraying device 90 may comprise a spray bar separate from the wiper blade 60 and fitted to the arm 130.

The device 90 for spraying the windscreen washer liquid is fed with windscreen washer liquid by a pipe 2. In the example described, the pipe 2 extends from an exit under the bonnet to the wiper blade 60. This pipe 2 may, for example, be secured to the arm 130 by means of securing clips (not shown) which keep the pipe 2 in position on the arm 130.

The pipe 2 is connected at a first end under the bonnet to a reservoir 50 of windscreen washer liquid associated with a pump 70 making it possible to carry the windscreen washer liquid from the reservoir 50 to the spraying device 90. The pump 70 is arranged so as to be able to be initiated from the inside of the vehicle by the vehicle driver or by an automatic system.

The driver 10, according to the invention, is produced in one piece by moulding a material of the aluminium or Zamak type.

The driver 10 extends generally longitudinally along an axis Y, that is to say in a direction that is parallel, or substantially parallel, to a direction of extension of the arm 130 between two opposite longitudinal ends 28 and 29.

The first end 28 of the driver 10 is configured to allow the fastening of the driver 10 to the arm 130 via the pivot assembly 120.

The second end 29 is arranged to secure the driver 10 to a drive shaft 80 that can be seen in FIG. 1, with a rotation axis X. The driver 10 is used to transmit the rotary movement of the shaft 80 to the arm 130.

The driver 10 is secured to the drive shaft 80 by a nut (not shown in FIG. 1) which is screwed onto the shaft 80. As illustrated in FIG. 1, the nut is covered by a cap 20 which comes on top of the driver 10.

The driver 10 comprises, at the second end 29, an outer contour 13 that is circularly arcuate when the driver 10 is observed along the axis X. The driver 10 comprises, around an orifice 11 and on its lower face 14, a housing 30 that can be seen in FIG. 2a arranged to receive a curved portion 12 of the windscreen washer liquid pipe 2.

As illustrated in FIGS. 1, 2a and 2b, the curved portion 12 of the pipe 2 is set back from the outer contour 13 of the driver 10 when the device 1 is observed along the rotation axis X.

Thus, when the driver 10 is folded down against the windscreen 140 as illustrated in FIG. 1, the curved portion 12 is invisible when the device 1 is observed along the rotation axis X.

This makes it possible to enhance the appearance of the device 1.

The housing 30 of the driver 10 is described in greater detail with reference to FIGS. 2a and 2b.

The driver 10 comprises, at the second end 29, the orifice 11 that is of circular shape when it is observed along the axis X, arranged to receive the drive shaft 80.

The housing 30 is formed on the substantially flat lower face 14. The housing 30 of the driver 10 is formed between a radially inner rib 16 and two radially outer ribs 17. These ribs 16 and 17 make it possible to effectively retain the curved portion 12 of the pipe during the oscillatory movements of the windscreen wiper arm 130. The inner rib 16 and the outer ribs 17 are circularly arcuate, centred on the orifice 11, when the driver 10 is observed along the rotation axis X.

The outer ribs 17 extend parallel to the outer contour 13 of the driver 10.

The inner rib 16 extends over an angular aperture of at least 300°, as shown in FIG. 2b.

The shorter outer ribs 17 each extend over less than 90°.

The driver 10 also comprises two click-and-ratchet fasteners 18 arranged to retain the curved portion 12 of the pipe 2 in the housing 30. These click-and-ratchet fasteners 18 are connected to the top of the inner rib 16.

The two click-and-ratchet fasteners 18 are each formed by a return which extends parallel to the lower face 14 of the driver 10, and this return rests on the curved portion 12 of the pipe 2.

The driver 10 also comprises an element 19 for guiding the windscreen washer liquid pipe 2, arranged to guide the curved portion 12 of the pipe 2 towards the housing 30. The main role of this guiding element 19 is to ensure a good curvature for the pipe during the oscillations of the windscreen wiper arm 130 and to allow the pipe 2 to be better retained by the driver 10. This guiding element 19 is pin shaped.

By virtue of this housing 30, the mounting of the pipe 2 on the driver 10 is removable making it possible, if necessary, to change the pipe 2 relatively easily.

The thickness of the driver 10 is reduced in a zone 31 so as to limit the overall weight of the driver.

In order to mount the pipe 2 in the driver 10, the pipe 2 is inserted substantially radially into the housing 30 of the driver 10. The pipe 2 is then deformed so as to have the curved portion 12 inserted into the housing 30.

In the example that has just been described, the driver 10 comprises an inner rib 16 and two outer ribs 17. Naturally, there is no departure from the context of the invention when the number and/or the shape of these ribs vary.

For example, FIG. 3 shows a driver 10' comprising an inner rib 16' which is cylindrically closed around the orifice 11.

The driver 10' comprises a single outer rib 17 extending over an angle of approximately 60°. The driver 10' is provided with orifices 33, in line with the click-and-ratchet fasteners 18, these orifices 33 being moulded together with the driver 10.

FIGS. 4a and 4b represent a driver 10" according to another exemplary embodiment of the invention.

The driver 10" comprises an inner rib 16" extending over approximately 270° around the orifice 11. This inner rib 16" comprises, at one of its ends, facing the guiding means 19, a wall 34 destined to come into contact with the pipe 2. This wall 34, associated with the guiding means 19, makes it possible to hold the pipe with a pinching effect.

In the examples that have just been described, the housing of the curved portion of the pipe is formed on the driver. There is no departure from the scope of the present invention when this housing is formed on a cap.

Shown in FIGS. 5a and 5b is such a device 1b comprising a driver 10b and a cap 20b, which cap 20b comprises a housing 30b for receiving the curved portion 12 of the pipe 2.

The cap 20b comprises a radially inner skirt 24 and a radially outer skirt 25. These two skirts, inner skirt 24 and outer skirt 25, have a substantially axi-symmetric shape with an axis X.

These skirts 24 and 25 are connected to an upper wall 21 that is substantially domed towards the top.

The housing 30b is formed between these two skirts 24 and 25. The inner skirt 24 defines a cavity 32 and comprises striations 29 capable of engaging on the nut 35 as can be seen in FIG. 5b.

The outer skirt 25 comprises, on its inner face, two click-and-ratchet fasteners 18b arranged to retain the curved portion 12 of the pipe 2 in the housing 30b of the cap 20b, this click-and-ratchet fastener 18b advantageously being connected to the outer skirt of the cap. The click-and-ratchet fasteners 18b each comprise a return which extends parallel to the lower face 14 of the driver 10 and which rests on the curved portion 12 of the pipe 2.

The housing 30b of the cap 20b is arranged such that the curved portion 12 of the pipe 2 extends over an angular aperture of approximately 180°.

The cap 20b is in one piece and is obtained by injection moulding in plastic.

The cap 20b also comprises an entrance slot 26 opening into the housing 30b and an exit slot 27 from the housing 30b and the curved portion of the pipe 2 extends from the entrance slot 26 to the exit slot 27. The entrance slot 26 and exit slot 27 are formed on the outer skirt of the cap 25.

The cavity 32 of the cap 20b makes it possible to cover a nut 35. As can be seen in FIG. 5b, the cap 20b is placed on the substantially flat upper face 15 of the driver 10b. The striations 29 of the cap 20b engage with the outer periphery of the nut 35.

The driver 10b comprises a recess 36 on which the outer skirt 25 of the cap 20b rests.

The driver 10b has no elements coming into contact with the portion 12 of the pipe 2, this curved portion being retained only by virtue of the cap 20b.

In order to mount the pipe 2 in the cap 20b, the pipe 2 is inserted substantially axially into the housing 30b of the cap 20b.

The cap 20b is attached removably to the nut 35.

The invention claimed is:

1. A retaining device for retaining a windscreen washer liquid pipe, the device comprising:
   the pipe;
   a driver comprising an orifice arranged to receive a rotation shaft, the shaft being rotated about a rotation axis, the driver having an outer contour when the driver is observed along the rotation axis;
   wherein the driver comprises a housing arranged to receive at least partly the pipe in the following configuration:
      the pipe comprises a curved portion around the orifice, and
      when the device is observed along the rotation axis with a cap capable of being fitted to a drive assembled on the driver, the curved portion of the pipe is set back from the outer contour of the driver,
   wherein the housing receiving the curved portion of the pipe is formed on the driver, and
   wherein the driver comprises a substantially flat lower face, and the housing is formed between at least one radially inner rib and one radially outer rib that protrude from the lower face of the driver.

2. The retaining device according to claim 1, wherein the retaining device is arranged to allow a removable mounting of the pipe in the housing.

3. The retaining device according to claim 1, wherein the outer contour of the driver is substantially circularly arcuate around the orifice.

4. The retaining device according to claim 1, wherein at least one of the inner rib and the outer rib is of circularly arcuate shape, centred on the orifice of the driver, when the driver is observed along the rotation axis.

5. The retaining device according to claim 1, wherein the driver comprises at least one click-and-ratchet fastener arranged to retain the curved portion of the pipe in the housing.

6. The retaining device according to claim 1, wherein the driver comprises at least one element for guiding the windscreen washer liquid pipe, arranged to guide the curved portion of the pipe towards the housing.

7. The retaining device according to claim 1, wherein the cap capable of being fitted to the driver is at a distance from the curved portion of the pipe.

8. A wiping system for a motor vehicle, comprising:
   the retaining device according to claim 1;
   a driving motor and/or a linkage arranged to drive a rotation shaft, the rotation shaft being capable of interacting with the driver of the retaining device.

9. A method for mounting the windscreen washer liquid pipe in the retaining device as claimed in claim 1, the method comprising:
   mounting the pipe on the retaining device.

* * * * *